US012803040B2

(12) United States Patent
Zhao et al.

(10) Patent No.: US 12,803,040 B2
(45) Date of Patent: Nov. 17, 2026

(54) LITHIUM-ION BATTERY

(71) Applicant: Zhuhai CosMX Battery Co., Ltd., Zhuhai (CN)

(72) Inventors: Junyi Zhao, Zhuhai (CN); Hu Zou, Zhuhai (CN)

(73) Assignee: ZHUHAI COSMX BATTERY CO., LTD., Zhuhai (CN)

(*) Notice: Subject to any disclaimer, the term of this patent is extended or adjusted under 35 U.S.C. 154(b) by 923 days.

(21) Appl. No.: 18/148,411

(22) Filed: Dec. 29, 2022

(65) Prior Publication Data

US 2023/0147863 A1 May 11, 2023

Related U.S. Application Data

(63) Continuation of application No. PCT/CN2021/137224, filed on Dec. 10, 2021.

(30) Foreign Application Priority Data

Dec. 10, 2020 (CN) ........................ 202011455824.X

(51) Int. Cl.

| | |
|---|---|
| ***H01M 10/04*** | (2006.01) |
| ***H01M 10/0525*** | (2010.01) |
| ***H01M 10/0587*** | (2010.01) |
| ***H01M 50/434*** | (2021.01) |
| *H01M 4/02* | (2006.01) |

(52) U.S. Cl.

CPC .................. *H01M 10/0431* (2013.01); *H01M 10/0525* (2013.01); *H01M 10/0587* (2013.01); *H01M 50/434* (2021.01); *H01M 2004/027* (2013.01); *H01M 2004/028* (2013.01)

(58) Field of Classification Search

CPC ........... H01M 10/0431; H01M 50/434; H01M 10/0525; H01M 10/0587; H01M 2004/027; H01M 2004/028

See application file for complete search history.

(56) References Cited

U.S. PATENT DOCUMENTS

| | | | |
|---|---|---|---|
| 2013/0244072 A1 | | 9/2013 | Miyazaki et al. |
| 2018/0047962 A1 | | 2/2018 | Honda |
| 2019/0198840 A1 | * | 6/2019 | Huang et al. |

FOREIGN PATENT DOCUMENTS

| | | | | |
|---|---|---|---|---|
| CN | 106129483 A | | 11/2016 |
| CN | 205828578 U | * | 12/2016 |
| CN | 206490141 U | | 9/2017 |
| CN | 20719976 U | | 4/2018 |
| CN | 110444718 A | * | 11/2019 |
| CN | 110690390 A | | 1/2020 |
| CN | 110760279 A | | 2/2020 |
| CN | 111129406 A | * | 5/2020 |
| CN | 112563584 A | | 3/2021 |
| CN | 112563665 A | | 3/2021 |
| JP | 2006260904 A | | 9/2006 |

OTHER PUBLICATIONS

CN110444718A_Machine Translation (Year: 2019).*

CN111129406A_Machine Translation (Year: 2020).*

Notice to Grant Patent Right for Invention received in the corresponding Chinese Application 202011455824.X, mailed May 2, 2023.

Supplementary European Search Report of EP 21902738.0.

The first Office Action received in corresponding CN Application 202011455824.X.

The international search report and written opinion received in corresponding International Application PCT/CN2021/137224, mailed Mar. 1, 2022.

* cited by examiner

*Primary Examiner* — Jonathan Johnson

(74) *Attorney, Agent, or Firm* — Kilpatrick Townsend & Stockton LLP

(57) ABSTRACT

A lithium battery includes a wound core and tabs, in which the wound core is formed by stacking and winding an inner separator, a first electrode sheet, an outer separator, and a second electrode sheet; each of the inner and outer separators has a clamping section, a first straight section, and a tail laminating section; the inner separator has a first inner laminating section; the clamping section, the first straight section and the tail laminating section of the inner separator are respectively laminated with the clamping section, the first straight section and the tail laminating section of the outer separator; and the first inner laminating section of the inner separator is represented as two parts of the inner separator that are laminated; an adhesive surface and a ceramic surface of the first inner laminating section of the inner separator have a wet peeling force of ≥2N/m and ≥1N/m, respectively.

20 Claims, 12 Drawing Sheets

LITHIUM-ION BATTERY

CROSS-REFERENCE TO RELATED APPLICATIONS

This application is a continuation of International Application No. PCT/CN2021/137224, filed on Dec. 10, 2021, which claims priority to Chinese Patent Application No. 202011455824.X, entitled “Lithium-ion Battery” and filed with the China National Intellectual Property Administration on Dec. 10, 2020, both of which are hereby incorporated by reference in their entireties.

TECHNICAL FIELD

This disclosure belongs to a technical field of lithium-ion batteries, and in particular relates to a lithium-ion battery.

BACKGROUND

The lithium battery includes a cell and tabs provided on the cell. The cell includes a separator, a positive electrode sheet and a negative electrode sheet. The separator is one of key materials of the lithium battery and is arranged between the positive and negative electrode sheets of the batter for separating the positive and negative electrode sheets to prevent short circuit of the battery. At present, the separators used in the lithium battery are generally polyolefin products with a hole structure, such as polyethylene (PE) separator, polypropylene (PP) separator, and PP/PE/PP three-layer separator. Inorganic particles, such as alumina particles, boehmite particles, magnesium oxide particles, etc., are coated on one-side or two-side surfaces of substrate separator, and based on this, the separator is subjected to double-sided pure glue coating or coating with mixed glue and ceramic particles to obtain a separator product finally, in which the glue may be a single polyvinylidene fluoride (PVDF) or a mixture of multiple PVDFs, and the coating method may be a water-based coating or an oil-based coating. The water-based separator is a finished product obtained by dispersing and grinding a single type of PVDF or multiple types of PVDFs, a dispersing agent and a glue in water to form a suspension, and then coating after filtration; the water-based separator may be coated by means of a micro-concave roll transfer coating or a high-speed nozzle coating., The oil-based separator is a finished product obtained by dissolving a single type of PVDF or multiple types of PVDFs in an organic solvent (such as 1-Methyl-2-pyrrolidinone (NMP), Dimethylacetamide (DMAC), etc.) according to a specific ratio, and then coating after forming a solution; the oil-based separator may be coated by means of micro-concave roll transfer coating or dip coating. In lithium batteries, the separator and the electrode sheet are bonded together, and the bonding force of the separator surface coating directly affects the quality of the finished cell; and unqualified adhesion of the separator surface coating may lead to insufficient hardness of the batteries, and even affect cycle performance, capacity retention rate, etc. of the batteries.

SUMMARY

The purpose of this disclosure is to provide a lithium-ion battery with good hardness and good cyclic performance.

In order to achieve the above purpose, this disclosure adopts the following technical solutions.

A lithium-ion battery includes a wound core and tabs, in which the wound core is formed by stacking and winding an inner separator, a first electrode sheet, an outer separator, and a second electrode sheet, and the first electrode sheet and the second electrode sheet have opposite polarity; the inner separator is located at the innermost layer of the wound core, and each of the inner separator and the outer separator has a clamping section, a first straight section connected with the clamping section and located behind clamping section, and a tail laminating section extending beyond a tail end of the first electrode sheet; where, the first straight section is located in front of the first electrode sheet, the tail laminating section is a separator end, the inner separator has a first inner laminating section where is overlapped and contacted with itself after a rolling needle is drawn out; and the clamping section, the first straight section and the tail laminating section of the inner separator are respectively laminated with the clamping section, the first straight section and the tail laminating section of the outer separator; the first inner laminating section of the inner separator is a part where the inner separator is laminated with itself; an adhesive surface of the first inner laminating section of the inner separator has a wet peeling force ≥2 N/m, and a ceramic surface of the first inner laminating section of the inner separator has a wet peeling force ≥1 N/m.

More specifically, the wet peeling force is determined by the following steps:

S1: cutting a separator to be tested into separator samples with suitable size, and aligning and stacking two pieces of separator samples to be tested;

S2: placing the two pieces of separator samples to be tested that are stacked into an aluminum-plastic film for packaging, injecting an electrolyte, vacuuming and sealing;

S3: subjecting the sealed aluminum-plastic film to a hot-pressing treatment using a formation machine under a temperature of 80° C. and a pressure of 0.8 MPa for 2 h;

S4: removing the separator samples to be tested from the aluminum-plastic film after the hot-pressing treatment is completed, wiping the electrolyte off the separator samples, placing the wiped separator samples into a hard sealer, and performing a further hot-pressing treatment under a temperature of 100° C. and a pressure of 0.2 MPa for 10 s; and S5, separating the two pieces of separator samples to be tested that are pressed together from one end of the separator samples after the further hot-pressing treatment is completed, performing a 90° peeling, and recording a peeling force during separation of the separator samples to be tested, in which the peeling force is called a wet peeling force.

More specifically, a length of the first inner laminated section of the inner separator is 30-60% of a width of the wound core.

More specifically, each of the inner separator and the outer separator includes a base film, a ceramic layer and an adhesive layer; and one surface of the base film is provided with the ceramic layer, and the other surface of the base film is provided with the adhesive layer; an outer surface of the ceramic layer is provided with the adhesive layer; a surface of the separator having both the ceramic layer and the adhesive layer is a ceramic surface, and a surface of the separator only having the adhesive layer is an adhesive surface.

More specifically, surfaces of the inner separator and of the outer separator that face each other on the clamping section, the first straight section and the tail laminating section are ceramic surfaces; and a surface of the inner separator that faces to itself on the first laminating section thereof is the adhesive surface.

More specifically, surfaces of the inner separator and of the outer separator that face each other on the clamping section, the first straight section and the tail laminating section are the adhesive surfaces; and a surface of the inner separator that faces to itself on the first laminating section thereof is the ceramic surface.

More specifically, a length of the clamping section of the inner separator and a length of the clamping section of the outer separator are each 1-15% of a width of the wound core.

More specifically, a length of the first straight section of the inner separator and a length of the first straight section of the outer separator are each 40-50% of the width of the wound core.

More specifically, a length of the tail laminating section of the inner separator and a length of the tail laminating section of the outer separator are each ≥5 mm; and/or the length of the tail laminating section of the inner separator and the length of the tail laminating section of the outer separator are each 0.1-10% of the width of the wound core.

Further, the lithium battery has an overall hardness ≥200 N.

As can be seen from the above technical solutions, the wound core in the lithium battery of this disclosure is prepared by using an inner separator in which its first inner laminating section has a specific wet peeling force, the separator has a good bonding effect and can form a good bonding with the positive and negative electrode sheets to form a battery with good hardness. The wet peeling force of the separator of this disclosure is determined by: subjecting the separators to swell under a certain temperature and pressure in the electrolyte environment, hot pressing at a low speed under high temperature to form a sample,. and performing a test on peeling between the adhesive layers or the ceramic layers of the separators using an electronic universal testing machine. According to the wet peeling force between layers, the battery hardness in the subsequent process may be determined in advance before formation, and the adhesion force between the main materials of the cell may be identified in advance, so as to select the separator with a wet peeling force meeting the requirements to achieve the optimal output of the adhesion force, and then obtain the battery with better hardness and performance.

Furthermore, a dry peeling force of each of the first straight section of the inner separator and the first straight section of the outer separator is less than 8N/m, and the dry peeling force is determined by the following steps:

- S1: cutting a separator to be tested into separator samples with suitable size and aligning and stacking two pieces of separator samples to be tested;
- S2: subjecting stacked separator samples to be tested to a hot-pressing treatment under a temperature of 100° C. and a pressure of 0.2 MPa for 10 s; and
- S3: after the hot-pressing treatment is completed, separating the separator samples to be tested that are pressed together from one end of the separator samples to be tested, performing a 90° peeling, and recording a peeling force during separation of the separator samples to be tested, that is, the dry peeling force.

Further, the dry peeling force is a dry peeling force of a ceramic surface of the separator.

Further, each of the inner separator and the outer separator have an adhesive transfer ratio of 20-40%, the adhesive transfer area ratio is a ratio of an adhesive transfer mass to a separator area, and the adhesive transfer mass is calculated by subtracting a separator mass after dry peeling from a separator mass before dry peeling.

Suitable separator material is selected based on the dry peeling force of the separator, so that the separator is matched with a rolling needle, and the phenomenon that the electrode sheets are folded after winding, top & side sealing and baking can be reduced, so as to improve the product yield and the quality of finished product. More preferably, the dry peeling force is a dry peeling force of the ceramic surface of the separator.

More specifically, the ceramic layer includes ceramic particles and an adhesive polymer; the ceramic particles are one or more of alumina particles, boehmite particles, and magnesia particles; the adhesive polymer is at least one of polyvinylidene fluoride, polyvinylpyrrolidone, vinylidene fluoride-hexafluoropropylene polymer, polyacrylonitrile, sodium carboxymethyl cellulose, sodium polyacrylate, polyacrylic acid, polyacrylate, styrene-butadiene copolymer, butadiene-acrylonitrile polymer, polyvinyl alcohol, polymethyl acrylate, polymethyl methacrylate, polyethyl acrylate, and polyacrylic acid-styrene polymer.

More specifically, a particle size of the ceramic particles has the following distribution: D10 particle size being 0.15-0.3 μm, D50 particle size being 0.35-0.45 μm, D90 particle size being 0.6-0.8 μm, and D100 particle size being less than 4.5 μm.

More specifically, the adhesive layer includes an adhesive polymer, and the adhesive polymer is at least one of polyvinylidene fluoride, polyvinylpyrrolidone, vinylidene fluoride-hexafluoropropylene polymer, polyacrylonitrile, sodium carboxymethyl cellulose, sodium polyacrylate, polyacrylic acid, polyacrylate, styrene-butadiene copolymer, butadiene-acrylonitrile polymer, polyvinyl alcohol, polymethyl acrylate, polymethyl methacrylate, polyethyl acrylate and polyacrylic acid-styrene polymer.

More specifically, the adhesive layer has a thickness of 0.5 μm to 3 μm, and a packing density of 0.6 $g/m^2$ to 3.0 $g/m^2$.

More specifically, the separator is a water-based separator, and the adhesive layer includes an adhesive polymer, a binder and a dispersing agent, in which based on the total mass of the adhesive layer, the content of the adhesive polymer is 92-96%, and the content of the binder is 2.5-5.5%, and the content of the dispersing agent is 1.5-2.5%; or, the separator is an oil-based mixed-coating separator, and the adhesive layer includes an adhesive polymer and ceramic particles, in which based on the total mass of the adhesive layer, the content of the adhesive polymer is 30-50%, and the content of the ceramic particles is 50-70%; or, the separator is a pure oil-based separator, and the adhesive layer includes an adhesive polymer, and the adhesive polymer has a molecular weight of 0.3 to 1 million.

BRIEF DESCRIPTION OF DRAWINGS

In order to illustrate the examples of this disclosure more clearly, the accompanying drawings that need to bhe used in the description of the examples or prior arts will be introduced briefly as following. Obviously, the accompanying drawings in the following description are only some examples of this disclosure. For those skilled in the art, other accompanying drawings can also be obtained from these accompanying drawings without any creative effort.

The specific embodiments of this disclosure will be described in further detail below with reference to the accompanying drawings.

DESCRIPTION OF EMBODIMENTS

This disclosure will be described in detail below with reference to the accompanying drawings. When describing the embodiments of this disclosure in detail, for the convenience of explanation, the accompanying drawings representing a device structure will not be partially enlarged according to the general scale, and the schematic diagrams are only illustrative, which should not limit the protection scope of this disclosure. It should be noted that the accompanying drawings are in a simplified form and all use inaccurate scales, and are only used to facilitate and clearly assist explaining the purpose of the embodiments of this disclosure.

Figure 1:
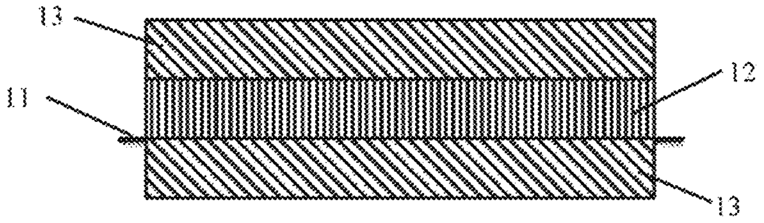
FIG. 1 is a schematic structural diagram of a lithium battery separator.

A lithium battery includes a wound core and tabs. The wound core is formed by stacking a positive electrode sheet (a first electrode sheet), a negative electrode sheet (a second electrode sheet) and a separator together, and then winding them. The separator is located between the positive electrode sheet and the negative electrode sheet. As shown in FIG. 1, the separator of the lithium battery includes a base film 11, a ceramic layer 12 provided on one or both sides of the base film 11, and an adhesive layer 13 located at the outermost layer of the separator. The separator shown in FIG. 1 has the ceramic layer 12 only provided on one surface of the base film 11 and the adhesive layer 13 provided on the other surface of the base film 11, and an outer surface of the ceramic layer 12 is also provided with the adhesive layer 13. The separator of this embodiment has a structure of the base film+single-layer ceramic layer+double-sided adhesive layer. A surface of the separator with both the ceramic layer and the adhesive layer is defined as a ceramic surface, and a surface of the separator only with the adhesive layer is defined as an adhesive surface or a substrate surface.

The base film may be a single-layer PE (polyethylene) film or a single-layer PP (polypropylene) film or a three-layer PP-PE-PP film structure, and a thickness of the base film may be 3 μm-20 μm. When only one side of the separator is provided with the ceramic layer, a thickness of the ceramic layer may be 0.5 μm-3 μm; and when both sides of the separator are provided with the ceramic layers, the thickness of the ceramic layer may be 0.5 μm-5 μm. The ceramic layer contains ceramic particles and an adhesive polymer, and the ceramic particles may be alumina particles, boehmite particles, magnesium oxide particles, or combination thereof, and the adhesive polymer is at least one of polyvinylidene fluoride, polyvinylpyrrolidone, vinylidene fluoride-hexafluoropropylene polymer, polyacrylonitrile, sodium carboxymethyl cellulose, sodium polyacrylate, polyacrylic acid, polyacrylate, styrene-butadiene copolymer, butadiene-acrylonitrile polymer, polyvinyl alcohol, polymethyl acrylate, polymethyl methacrylate, polyethyl acrylate and polyactylic acid-styrene polymer. In the ceramic layer, the content (mass percentage) of ceramic particles is 85-92%, with a balance of adhesive polymer. The particle size distribution of the ceramic particles is: D10 particle size being 0.15-0.3 μm, D50 particle size being 0.35-0.45 μm,. D90 particle size being 0.6 -0.8 μm, D100 particle size being <4.5 μm.

Figure 2A:
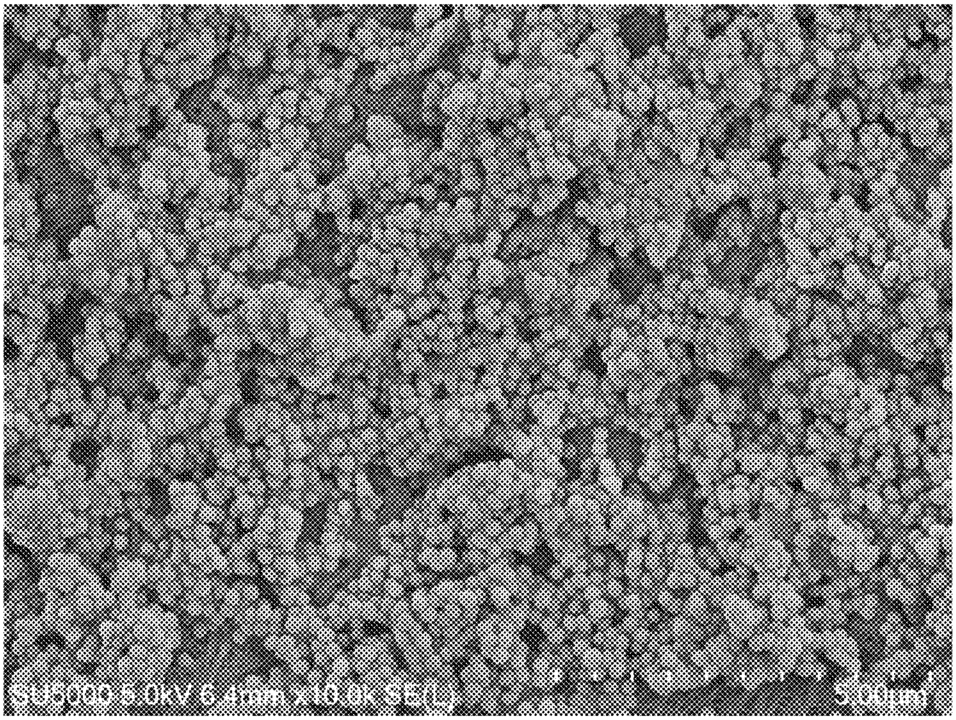
FIG. 2*a* and FIG. 2*b* are SEM images showing a substrate surface and a ceramic surface of a water-based separator, respectively.
Figure 2B:
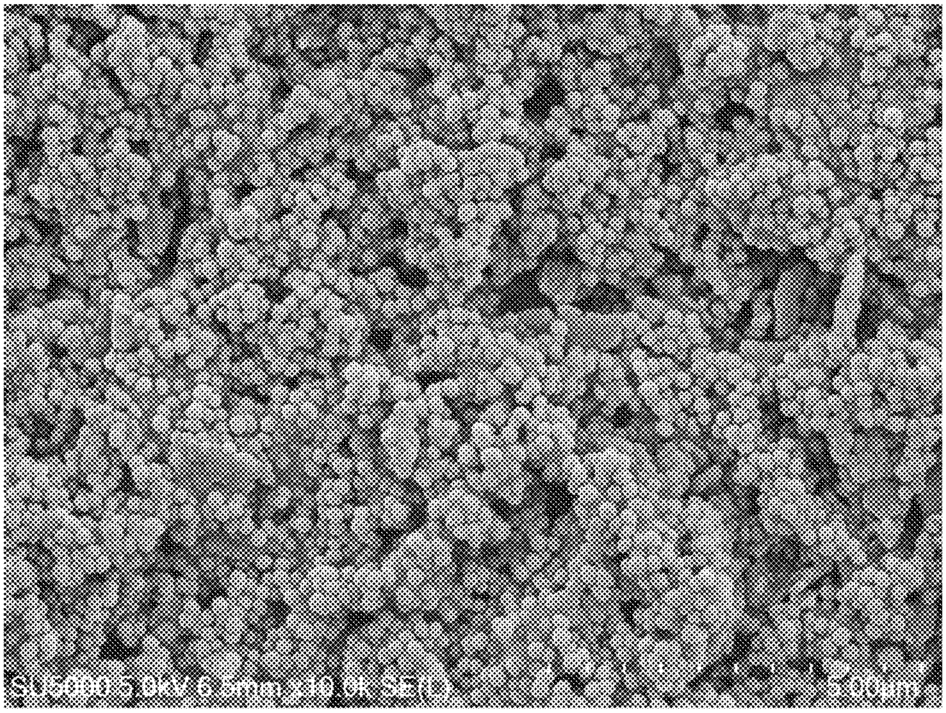
Figure 3:
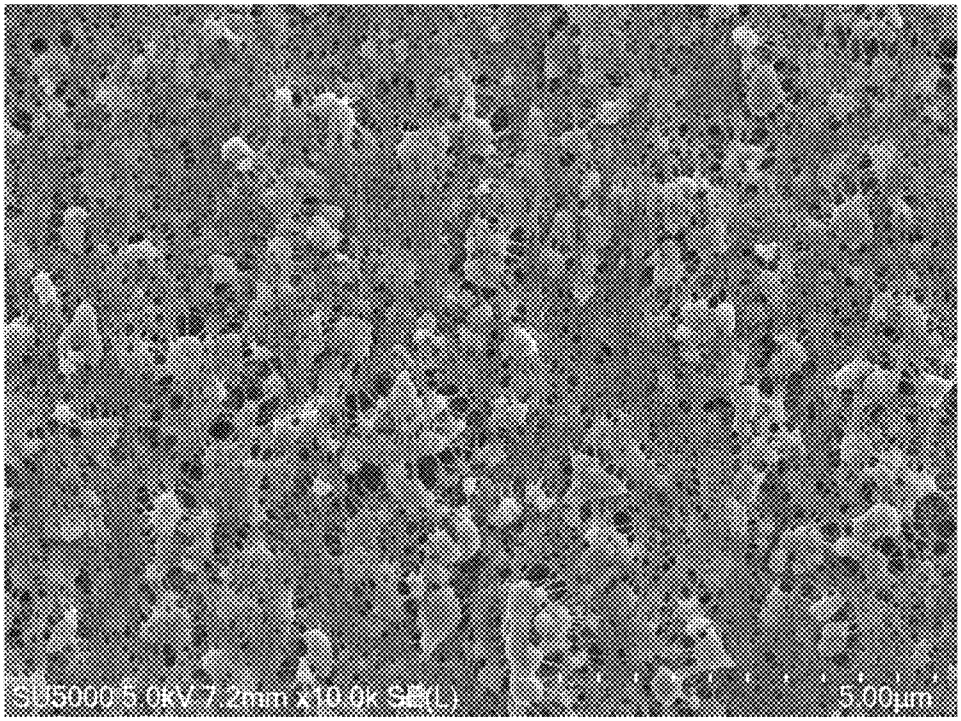
FIG. 3 is an SEM image showing a surface of an oil-based mixed-coating separator.
Figure 4A:
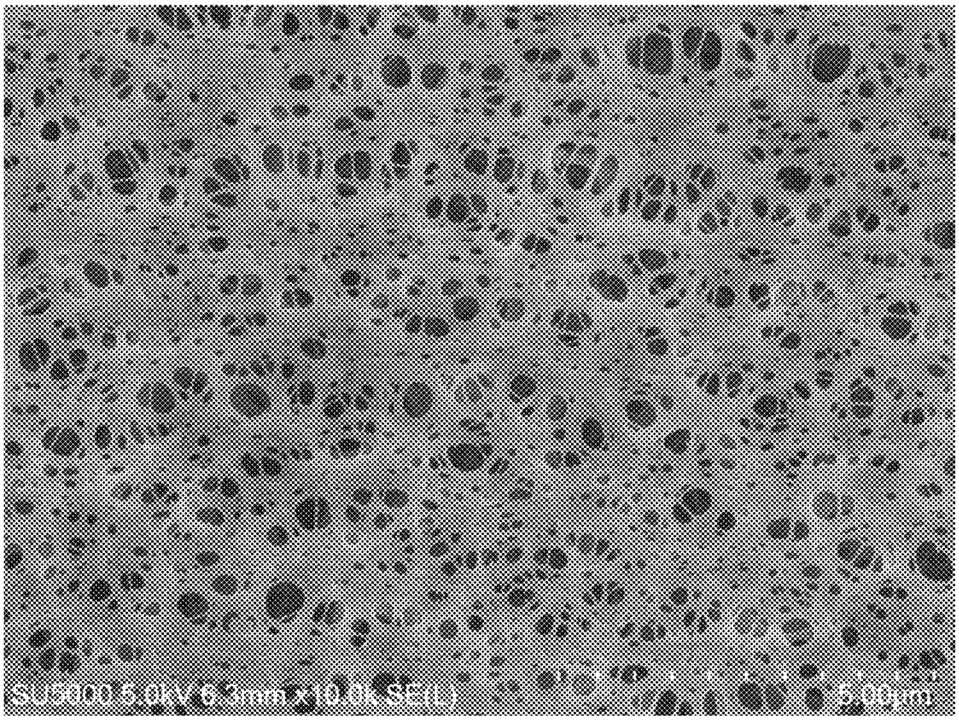
FIG. 4*a* and FIG. 4*b* are SEM images showing a substrate surface and a ceramic surface of an oil-based separator, respectively.
Figure 4B:
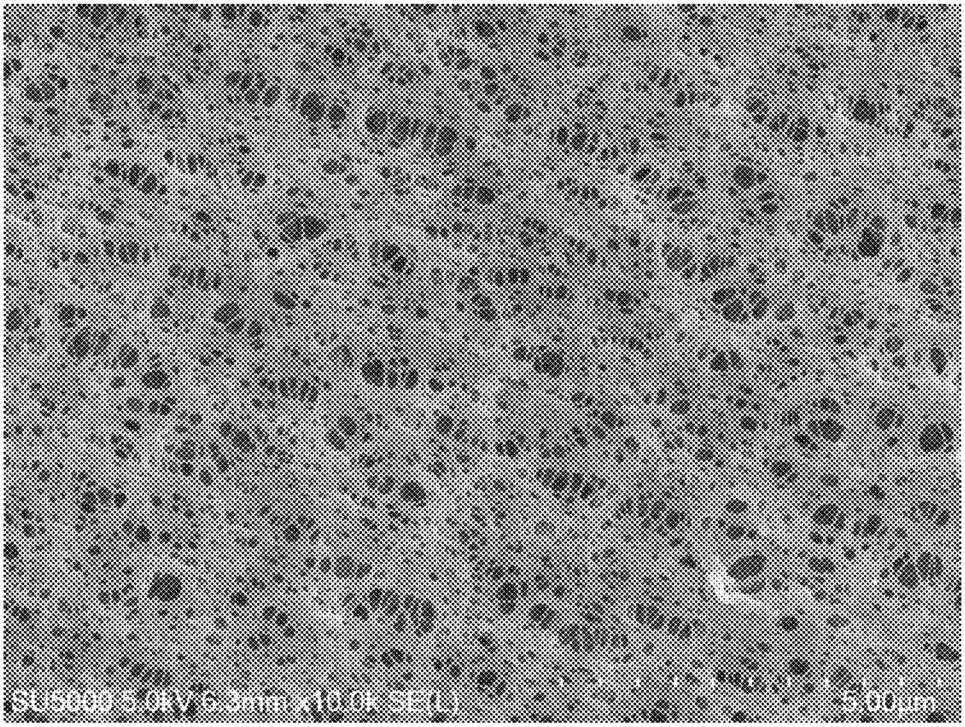

The adhesive layer has a thickness of 0.5 μm-3 μm and a packing density of 0.6 $g/m^2$-3.0 $g/m^2$, and the adhesive layer contains the adhesive polymer, and the adhesive polymer is at least one of polyvinylidene fluoride, polyvinylpyrrolidone, vinylidene fluoride-hexafluoropropylene polymer, polyacrylonitrile, sodium carboxymethyl cellulose, sodium polyacrylate, polyacrylic acid, polyacrylate, styrene-butadiene copolymer, butadiene-acrylonitrile polymer, polyvinyl alcohol, polymethyl acrylate, polymethyl methacrylate, polyethyl acrylate, and polyacrylic acid-styrene polymer. When the separator is a water-based separator, the adhesive layer includes the adhesive polymer, a binder and a dispersing agent, in which based on the total amount of the adhesive layer, the content (mass percent) of the adhesive polymer is 92-96%, and the content of the binder is 2.5-5.5%, and the content of the dispersing agent is 1.5-2.5%. FIG. 2*a* and FIG. 2*b* are SEM images showing a substrate surface and a ceramic surface of a water-based separator, respectively. When the separator is an oil-based mixed-coating separator, the adhesive layer includes an adhesive polymer and ceramic particles, in which based on the total amount of the adhesive layer, the adhesive polymer has a content (mass percentage) of 30-50% and the content of the ceramic particles is 50-70%. FIG. 3 is an SEM image showing a surface of an oil-based mixed-coating separator. When the separator is a pure oil-based separator, the content of the adhesive polymer in the adhesive layer is 100% of the total amount of the adhesive layer, and the adhesive polymer has a molecular weight of 0.3 to 1 million. FIG. 4*a* and FIG. 4*b* are SEM images showing a substrate surface and a ceramic surface of an oil-based separator, respectively.

Figure 5:
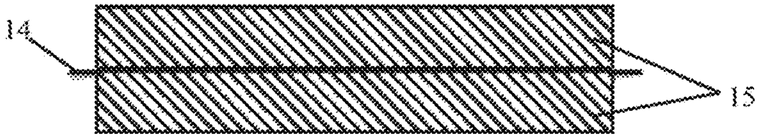
FIG. 5 is a schematic structural diagram of a positive electrode sheet of a lithium battery.

As shown in FIG. 5, the positive electrode sheet of the lithium battery includes a positive electrode foil 14 and positive electrode active material layers 15 coated on both sides of the positive electrode foil 14. The positive electrode foil 14 may be an aluminum foil and have a thickness of 8 μm-14 μm. The positive electrode active material layer includes a positive electrode material, a conductive agent and a binder, and the positive electrode material may be one of $LiCoO_2$, $LiNiO_2$, $LiFePO_4$, $LiMn_2O_4$, and $LiNi_xCo_yM_{1-x-y}O_2$, and the conductive agent may be one or more of conductive carbon black, carbon nanotube, conductive graphite and graphene, and the binder may be one or more of polyvinylidene fluoride, vinylidene fluoride-fluorinated olefin copolymer, polytetrafluoroethylene, sodium carboxymethyl cellulose, styrene-butadiene rubber, polyurethane, fluorinated rubber and polyvinyl alcohol. In the positive electrode active material layer, the positive electrode material has a content (mass percentage) of 96-98.5%, and the conductive agent has a content of 0.5-2.5%, and the binder has a content of 1-1.5% based on the total amount of positive electrode active material layer.

Figure 6:
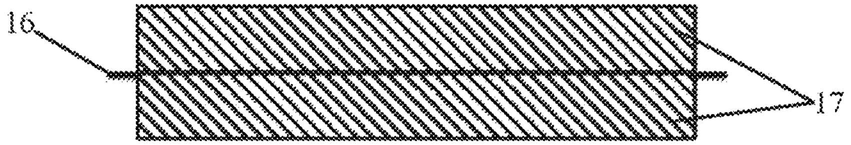
FIG. 6 is a schematic structural diagram of a negative electrode sheet of a lithium battery.

As shown in FIG. 6, the negative electrode sheet of the lithium battery includes a negative electrode foil 16 and negative electrode active material layers 17 coated on both sides of the negative electrode foil 16. The negative electrode foil 16 may be a copper foil, and have a thickness of 5 μm-10 μm. The negative electrode active material layer includes a negative electrode material, a conductive agent, a binder and a dispersing agent. The negative electrode material may be one or more of mesophase carbon microsphere, artificial graphite, natural graphite, hard carbon, soft carbon, lithium titanate, silicon-based material, tin-based material and lithium metal; and the conductive agent may be conductive carbon black, carbon nanotuhe, conductive graphite and graphene; the binder may be one or more of polyvinylidene fluoride, vinylidene fluoride-fluorinated olefin copolymer, polytetrafluoroethylene, sodium carboxymethyl cellulose, styrene-butadiene rubber, polyurethane, fluorinated. rubber, and polyvinyl alcohol; and the dispersing agent may be sodium carboxymethyl cellulose or potassium carboxymethyl cellulose. In the negative electrode active material layer, the content (mass percentage) of the negative electrode material is 95-97%, and the content of the conductive agent is 1-2%, and the content of the binder is 1-1.5%, and the content of the dispersing agent is 0-1.5%, based on the total amount of negative electrode active material layer.

Figure 7A:
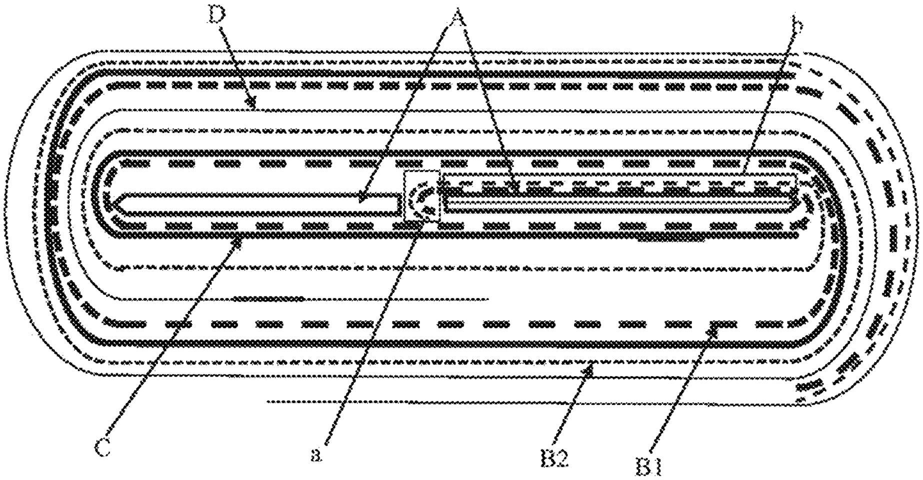
FIG. 7*a* is a schematic diagram of winding the separator and the positive and negative electrode sheets by a rolling needle.

As shown in FIG. 7*a*, during the preparation of the wound core, a rolling needle A clamps heads of two lavers of separators and drives the separators to rotate. In FIG. 7*a*, the thick dotted line represents a separator located at an inner side of the two layers of separators—an inner separator B1, where the inner separator B1i is in contact with the rolling needle A; and the thin dotted line represents a separator located at an outer side of the two layers of separators—an outer separator B2, where the outer separator B2 is stacked on the outside of the inner separator B1 and not in direct contact with the rolling needle A. During winding, the rolling needle A will clamp the heads of the two layers of separators, and a part of each separator that is clamped by the rolling needle is defined as a clamping section; and the clamping section of the inner separator B1 and the clamping section of the outer separator B2 are stacked together, for example, a part located in the wireframe a as shown in FIG. 7*a*. During the winding of separators, a part before first bending of the separators is defined as a first straight section, which is located behind the clamping section, and the first straight section of the inner separator B1 and the first straight section of the outer separator B2 is stacked together, for example, a part located in the wireframe b as shown in FIG. 7*a*. After the rolling needle A drives the separators to rotate for half a circle, a negative electrode pressing roller (not shown) presses against a negative electrode sheet C (the thick solid line in FIG. 7*a* represents the negative electrode sheet), and the negative electrode sheet C is introduced by the separators and located between the inner separator B1 and the outer separator B2. After rotating further for half a circle, a positive electrode pressing roller (not shown) presses against a positive electrode sheet D (the thin solid line in FIG. 7*a* represents the positive electrode sheet), and the positive electrode sheet D is introduced along the separators, so that the positive electrode sheet D and the negative electrode sheet C are separated by the separators, and the early-stage winding action is completed. And then, the positive and negative electrode pressing rollers are retracted, and the positive and negative electrode sheets rotate with the rotation of the separators to obtain a wound core, forming a winding structure which has a layer of separator—a layer of negative electrode sheet—a layer of separator—a layer of positive electrode sheet. In addition, another winding process may also be used, that is, after the rolling needle clamps the clamping section of the separators and rotates for half a circle, the positive and negative electrode sheets are simultaneously introduced to form a winding structure having a layer of separator—a layer of positive electrode sheet—a layer of separator—a layer of negative electrode sheet.

Figure 7B:
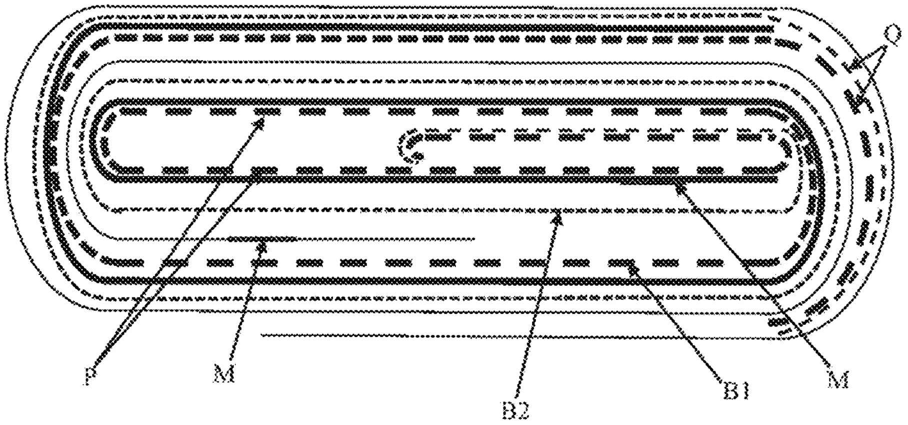
FIG. 7*b* is a schematic diagram of the wound core after the rolling needle is drawn out.

For the wound core of this embodiment, tails of the two layers of separators both extend beyond a tail of the positive electrode sheet, and the tails of the two layers of separators have a part overlapped and laminated together, in which end parts of the two layers of separators that extend beyond the positive electrode sheet and laminated together are each defined as a tail laminating section, for example, a part indicated by arrow Q as shown in FIG. 7*b*. When the rolling needle A is drawn out, parts of the inner separator B1 that are in direct contact with the rolling needle will be overlapped and contacted with each other together due to the drawing out of the rolling needle; the parts of the inner separator B1 that overlap with each other after the rolling needle A is drawn out are defined as a first inner laminating section, for example, parts as indicated by arrow P in FIG. 7*b*. A length of the first inner laminating section of the the inner separator B1 is 30-60% of a width of the wound core.

The wound core shown in FIG. 7*b* has two structures., One structure is: a surface of the separator facing the rolling needle is the ceramic surface, and the facing surfaces between the two adjacent separator layers are adhesive surfaces (the part in the wireframe a and the part in the wireframe b in FIG. 7*a*, and the part indicated by the arrow Q in FIG. 7*b*); after the rolling needle is drawn out, the clamping section of the inner separator B1 will be opposite to the first straight section thereof, that is, the ceramic surface of the clamping section is opposite to the ceramic surface of the first straight section. Another structure is: the surface of the separator facing the rolling needle is the adhesive surface, and the facing surfaces between the two adjacent separator layers are ceramic surfaces;: after the rolling needle is drawn out, the clamping section of the inner separator B1 will be opposite to the first straight section thereof, that is, the adhesive surface of the clamping section is opposite to the adhesive surface of the first straight section. That is, in the two structures, the facing surfaces between the two adjacent separator layers are made of the same material, and the facing surfaces formed by the overlapping of the inner separator itself are also made of the same material. More specifically, a length of the clamping section of the separator (including the inner separator and the outer separator) is 1-15% of a width of the wound core, and a length of the first straight section of the separator (including the inner separator and the outer separator) is 40-50% of the width of the wound core, and the tail laminating section of the separator (including the inner separator and the outer separator) has a length of at least 5 mm, which is 0.1-10% of the width of the wound core. The thick short lines in FIG. 7*a* and FIG. 7*b* indicate the tab M. The surface of the inner separator in the wound core will have swelling and bonding effect under the electrolyte environment, which will form an adhesion force between the separator layers. This adhesion force is mainly represented by van de Waals force.

Figure 8:
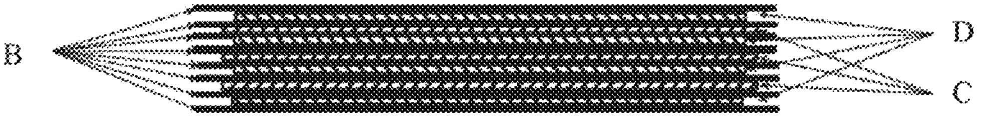
FIG. 8 is a cross-sectional view of the wound core.

The inventors found that the separator based on the above structure (including a selection of separator material, a setting of material components, and a structural arrangement of each layer of the separator) has a specific wet peeling force (being equal to a swelling-bonding force of the surface coating of the separator), through which the bonding effect of the separators between the layers of the wound core may be identified. Therefore, according to the wet peeling force, it is possible to identify the adhesion force between the separators and between the separators and the positive and negative electrodes in advance, judge whether the separator can meet the bonding requirements after the hot-pressing and formation of the cell in advance, identify the adhesion force between the main materials of the cell, and then select a separator with a specific wet peeling force to prepare the wound core of battery during manufacturing process, thereby obtaining a battery with better hardness and better performance. As the wet peeling force of the separator gets larger, the bonding effect between the separators becomes better, and the tearing force gets larger. As shown in FIG. 8, when the separator has a better adhesiveness in the electrolyte environment, the adjacent separator layers may be adhered to each other due to swelling in the process of forming the cell, which plays the role of bonding separators. As the adhesion force of the separator gets stronger, the bonding effect gets better, and the probability of short-circuit due to internal contact in the positive and negative electrode sheets becomes smaller when the cell is dropped, thereby increasing the safety performance of the cell. The wet peeling force of the separator (the swelling-bonding force, that is also, the adhesion force of the adhesive coating on the separator surface after swelling of the separator under the electrolyte environment) plays the role of fixing the structure of the wound core, and a separator material with a specific wet peeling force may be selected based on the wet peeling force of the separator, so that the separator can play a good bonding effect and form a good bonding with the positive and negative electrode sheets, a battery with better hardness is formed, and the probability of cycle failure caused by excessive expansion of the cell in the subsequent cycle is reduced, which is conducive to prolong cycle life of the battery.

The wet peeling force is determined by: performing a first hot pressing on the separator in an electrolyte environment, and then performing a second hot pressing on the separator in an electrolyte-free environment, and then performing a 90° peeling, in which the peeling force is the wet peeling force and can be used to reflect the adhesion performance of the coating on the separator surface after the adhesive of the separator is swollen. Hereinafter, with reference to FIG. 9 to FIG. 12, the test method of the wet peeling force is described as follows.

Figure 9:
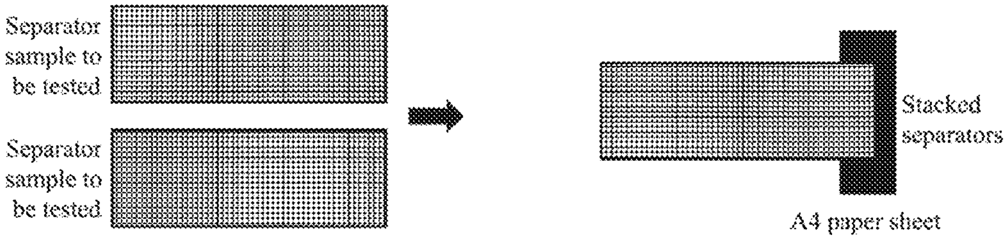
FIG. 9 is a schematic diagram of cut samples.

S1: the separator to be tested is cut into separator samples with suitable size; for example, the separator to be tested is cut into a long strip with a certain width, such as a small strip with a width of 15 mm. Two cut pieces of separator samples to be tested are aligned and stacked, and a paper sheet is introduced at one end of stacked samples so as to separate the two pieces of separator samples to be tested (FIG. 9). For example, when the separator at the first inner laminating section is tested, the separators that are laminated together at the first inner laminating section are cut into samples, followed by aligning and stacking.

Figure 10:
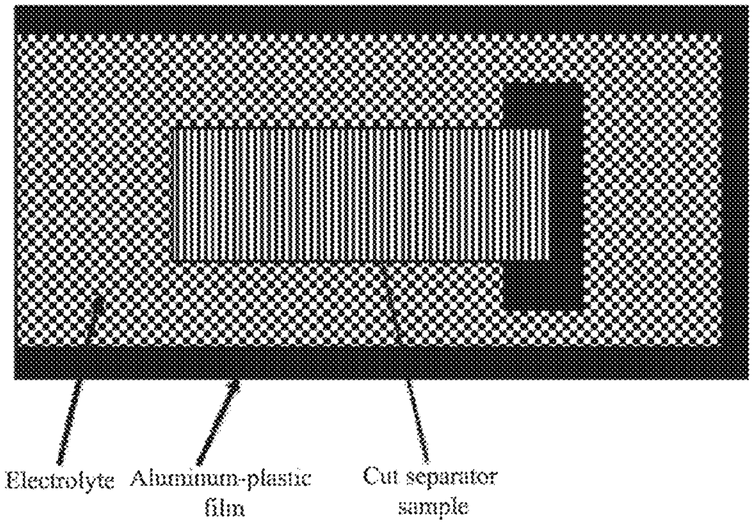
FIG. 10 is a schematic diagram of placing a separator into an aluminum-plastic film for liquid injection and sealing.
Figure 11:
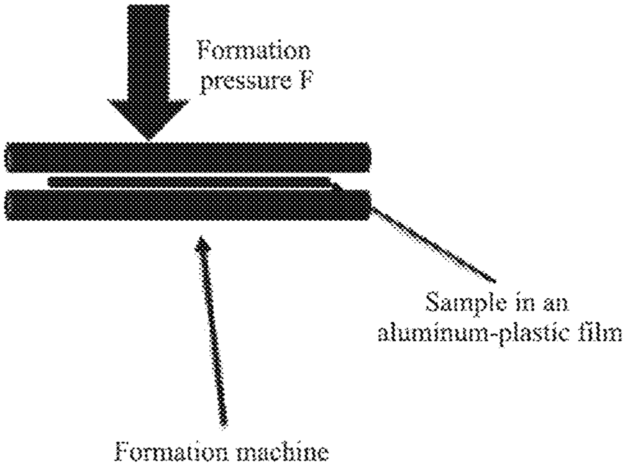
FIG. 11 is a schematic diagram of hot pressing the sealed aluminum-plastic film.
Figure 12:
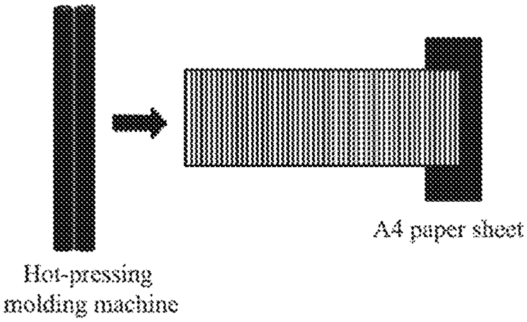
FIG. 12 is a schematic diagram of hot-pressing and compounding separators.

S2: placing the two separator samples to be tested that are stacked into an aluminum-plastic film for packaging, and then injecting an electrolyte, such as 10 g electrolyte and then vacuuming and sealing (FIG. 10).

S3: subjecting the sealed aluminum-plastic film to a hot-pressing treatment using a formation machine (FIG. 11) under a hot-pressing temperature of 68-90° C. and a pressure of 0.7-1.1 MPa; in this embodiment, the hot-pressing temperature is 80° C., the hot-pressing pressure is 0.8 MPa, and the hot-pressing time is 2 h.

S4: removing the separator samples to be tested from the aluminum-plastic film after the hot-pressing treatment is completed, wiping the electrolyte off the separator samples, placing the separator samples to bhe tested into a hard sealer, and performing a further hot-pressing treatment (FIG. 12); in this embodiment, the hot-pressing molding machine used is SKY-325R6, and the hot-pressing temperature is 100° C., the hot-pressing pressure is 0.2 MPa, and the hot-pressing speed is 1 mm/s.

Figure 13:
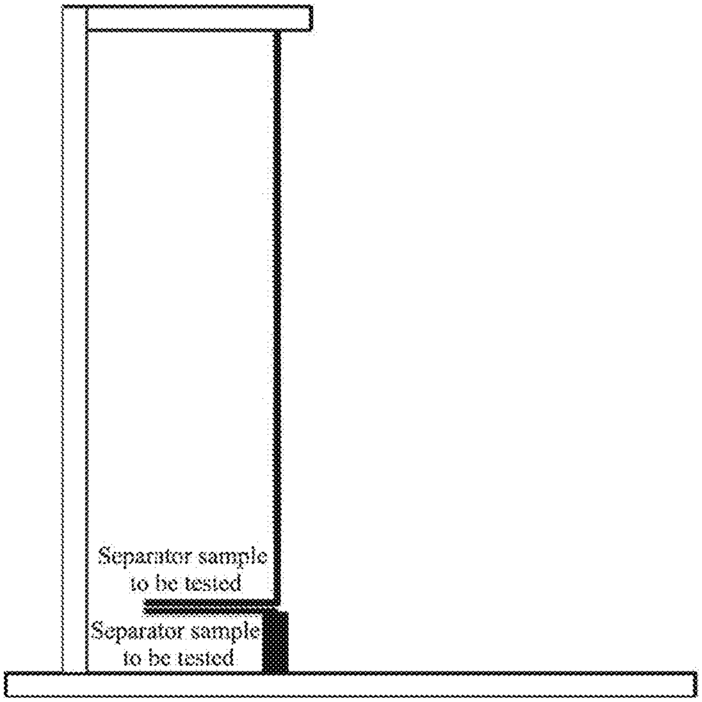
FIG. 13 is a schematic diagram of performing 90° peeling with an electronic universal testing machine.

S5: pulling out the paper sheet clamped between the separator samples to be tested after the hot-pressing treatment is completed, and separating the two separator samples to be tested pressed together from one end of the separator samples, performing a 90° peeling (FIG. 13), and recording the wet peeling force during the separation of the two separator samples to be tested; in this embodiment, an electronic universal testing machine is used to perform a 90° peeling test on the separator samples to be tested, where one end of one piece of the separator samples to be tested is fixed with a moving end of the electronic universal testing machine, and one end of the other piece of separator samples to be tested is fixed with a fixing end of the electronic universal testing machine, a preload speed and a test speed are set to be 100 mm/min, the two separator samples to be tested are separated, and the peeling force during the separation of the separator samples to be tested is recorded.

The table 1 below shows the results of wet peeling force testing on 3 different types of separators.

TABLE 1

| | Adhesive surface (N/m) | Ceramic surface (N/m) | | Ceramic surface & Adhesive surface (N/m) | | Adhesive surface (N/m) | Ceramic surface (N/m) |
|---|---|---|---|---|---|---|---|
| Oil-based separator 1 | 13.96 | 3.55 | Oil-based mixed-coating separator 1 | 11.58 | Water-based separator 1 | 2.92 | 1.82 |
| Oil-based separator 2 | 16.24 | 4.32 | Oil-based mixed-coating separator 2 | 12.78 | Water-based separator 2 | 2.25 | 1.68 |
| Oil-based separator 3 | 12.81 | 3.07 | Oil-based mixed-coating separator 3 | 12.76 | Water-based separator 3 | 3.26 | 1.53 |

Figure 21:
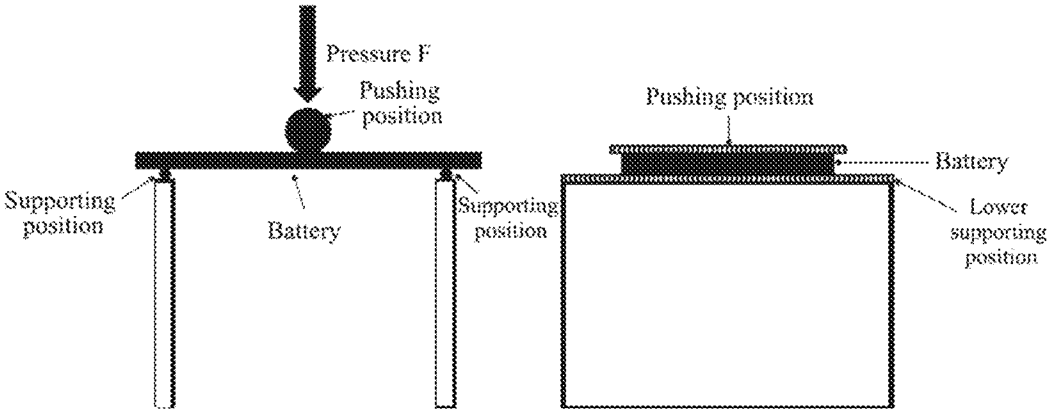
FIG. 21 is a schematic diagram showing a three-point hardness test.

Six kinds of separators are selected from the above separators tested for wet peeling force, wound together with the positive and negative electrode sheets to form a cell, and the cell was sealed and injected with the electrolyte, and performing formation to obtain a battery, in which the separators used have a width of 83.8 mm, and the positive electrode sheet has a width of 79.5 mm, and the negative electrode sheet has a width of 81.5 mm; and both the positive electrode sheet and the negative electrode sheet are conventional positive and negative electrode sheets for lithium batteries. At the same time, two kinds of existing separators are used to prepare batteries with the same positive and negative electrode sheets as comparative examples. The obtained battery is tested for hardness, thickness expansion rate and capacity retention rate, and the hardness test may be performed by a three-point hardness test method. The three-point hardness test method is as follows: as shown in FIG. 21,. the bottom surface of the battery is supported by two steel pipes which are located at the two ends of the battery, and another steel pipe is placed against in the middle of the top surface of the battery; during the testing, a pressure is applied to the battery surface by the steel pipes, in which the test parameters are as follows: a limit displacement due to pushing deformation being 3 mm, and the pressing speed being 6 mm/min, and the pressure when the battery is deformed is the test result of hardness.

The test results of hardness, thickness expansion rate and capacity retention rate are shown in table 2 below:

TABLE 2

| | Adhesive surface (N/m) | Ceramic surface (N/m) | Hardness data of battery (N) | Thickness expansion rate/% | Capacity retention rate/% |
|---|---|---|---|---|---|
| Comparative example 1 | 1.83 | 0.79 | 189 | The battery becomes soft and is not placed on a working table. | |
| Comparative example 2 | 1.23 | 0.63 | 167 | The battery becomes soft and is not placed on the working table. | |
| Water-based separator 1 | 2.92 | 1.82 | 271.37 | 12.2% | 70.49% (711 cycles) |
| Water-based separator 2 | 2.25 | 1.68 | 265.68 | 11.3% | 79.86% (711 cycles) |
| Oil-based separator 1 | 13.96 | 3.55 | 434.64 | 9.3% | 85.32% (984 cycles) |
| Oil-based separator 2 | 16.24 | 4.32 | 486.13 | 9.5% | 84.23% (984 cycles) |
| Oil-based mixed-coated separator 1 | 11.58 | | 559.62 | 8.8% | 86.57% (984 cycles) |
| Oil-based mixed-coated separator 2 | 12.78 | | 596.08 | 9.0% | 85.45% (984 cycles) |

Figure 14:
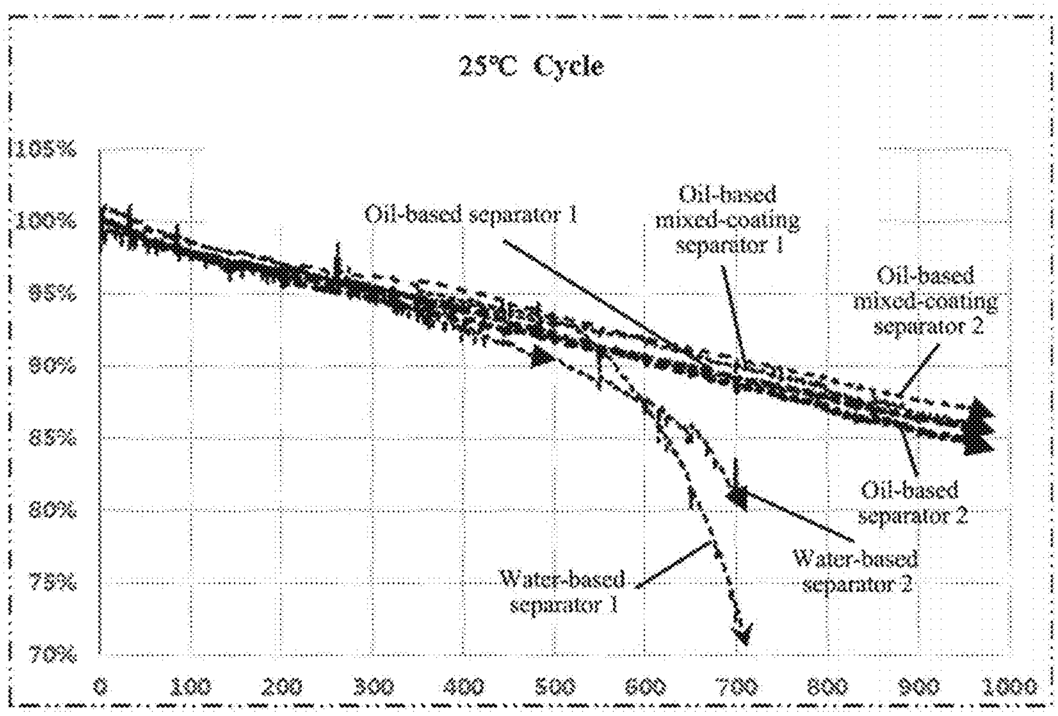
FIG. 14 shows a graph for cyclic test.

It can be seen from the above results that the adhesion forces (wet peeling forces) of the hot-pressed adhesive surface and ceramic surface after the water-based separator is swollen in the electrolyte environment are each smaller than those of the micro concave roll oil-based separator and the micro concave roll oil-based mixed-coaling separator peeling force), and the hardness data after the battery is removed from the working table may also indirectly reflect the adhesion effect between the separators, and the cycle characteristics of the battery may also reflect the current conclusions (FIG. 14). The adhesion force of the oil-based mixed-coating separator is better than that of the oil-based separator and the water-based separator, which indirectly proves the adhesion effect of the separator after the separator adhesive is swollen in the electrolyte environment; when the wet peeling force becomes larger, the subsequent cycle performance of the battery is relatively excellent, and the battery is also relatively hard, which has the possibility and performability of quantification. Based on the above tested hardness data of the batteries, the following conclusions can be drawn.

When the adhesive surface of the separator has a wet peeling force of <2 N/m and the ceramic surface of the separator has a wet peeling force of <1 N/m, the overall battery is soft, and the overall hardness of the battery is <200 N.

When the adhesive surface of the separator has a wet peeling force of 2 N/m-10 N/m and the ceramic surface of the separator has a wet peeling force of 1 N/m-2 N/m, the overall hardness of the battery is 200 N-400 N.

When the adhesive surface of the separator has a wet peeling force of >10 N/m and the ceramic surface of the separator has a wet peeling force of 2 N/m-10 N/m, the overall hardness of the battery is 400 N-550 N.

When the adhesive surface of the separator has a wet peeling force of >10 N/m and the ceramic surface of the separator has a wet peeling force of >10 N/m, the overall hardness of the battery is 550 N -800 N.

Based on the test results of hardness, thickness expansion rate and capacity retention rate, when the adhesive surface of the separator has the wet peeling force of ≥2 N/m and the ceramic surface of the separator has the wet peeling force of ≥1 N/m, the hardness and cycles of the battery prepared can meet a requirement of 500 cycles; as the peeling force of the separator gets stronger, the battery gets harder, the bonding effect between the electrode sheets and the separator becomes better; the hardness of the battery becomes greater, the long-term cycle ability and the capacity retention rate of the battery get better, and the thickness expansion rate decreases. Therefore, when the wound core is prepared, the separator may be selected according to the wet peeling force of the separator surface, in which the adhesive surface of the first inner laminating section of the inner separator has the wet peeling force of ≥2N/m and the ceramic surface of the first inner laminating section of the inner separator has the wet peeling force of ≥1N/m in the wound core of the lithium battery.

In the disclosure, according to the relationship between the wet peeling force of the separator and the hardness and the cycle performance of the battery, the separator with a wet peeling force meeting certain requirements is selected before the finding process, which can make the separator to be bonded easily and form Vander Waals force bonding effect of the separator with the negative electrode sheet and the positive electrode sheet, thereby forming a good bonding effect, and obtaining the battery with a relatively higher hardness. Moreover, the probability of cycle failure caused by excessive expansion of the battery is reduced in the subsequent cycle process; and the battery with good adhesion has an extended cycle life. By controlling the wet peeling force of the separator in this disclosure, the adhesion force displayed during formation and swelling process is controlled, and the hardness of the battery after formation can be effectively controlled. In addition, in the disclosure, the bonding effect of the separator coating between the layers of the wound core is identified through the wet peeling force, which can provide a quantitative index of the separator coating macroscopically, facilitate the management and control of the separator coating, and serve as a means of incoming management of the separator; by identifying the macroscopic index of the separator incoming, it can determine in advance whether the separator can meet the bonding requirements after the hot pressing and formation of the cell, so as to select the appropriate separator material to prepare the cell.

The inventors have further found that the adhesion force of the separator surface (coating) will also affect the preparation process of the wound core and the quality of the finished product; if the adhesion force of the coating on the separator surface is unqualified, it may lead to poor production, such as folded electrode sheets. The dry peeling force refers to performing a 90° peeling after the separator is hot pressed in an electrolyte-free environment. The dry peeling force may be used to select appropriate separator material. The dry peeling force of the separator is controlled to avoid the problem of the folding of electrode sheets after the wound core is removed from the working table during winding, packaged and dried, and improve the production yield of the wound core., The specific steps of dry peeling force test are as follows.

S1: the separator to be tested is cut into a separator sample with suitable size; for example, the separator to be tested is cut into a long strip with a certain width, such as a small strip with a width of 15 mm., Two cut pieces of separator samples to be tested are aligned and stacked, and a paper sheet is introduced at one end of stacked samples so as to separate the two pieces of separator samples to be tested.

S2: the two pieces of separator samples to be tested that are stacked are subjected to a hot-pressing treatment for laminated surfaces using a hot-pressing molding machine; in this embodiment, the hot-pressing molding machine used has a model of SKY-325R6, and a hot pressing temperature is 100° C., a surface pressure is 0.2 MPa, and a hot pressing time is 10 s.

S3: after the hot pressing treatment is completed, the paper sheet that is clamped between the separator samples to be tested is pulled out, and the two pieces of separator samples to be tested that are pressed together are separated from the end and subjected to a 90° peeling, followed by recording the dry peeling force during the separation of the two pieces of separator samples to be tested; in this embodiment, an electronic universal testing machine is used to perform a 90° peeling test on the separator samples to be tested, in which one end of one piece of the separator sample to bhe tested is fixed with a moving end of the electronic universal testing machine, and one end of the other piece of separator sample to be tested is fixed with a fixing end of the electronic universal testing machine, and a preload speed and a test speed are set to 100 mm/min, and the two pieces of separator samples to be tested are separated and the peeling force during the separation of the separator samples to be tested is recorded.

This disclosure reflects the adhesion between the separator coatings by the dry peeling force, therefore, when the dry peeling force of the separators is tested, the separators with same material that are pressed together are separated, in which the two separators have the same coating, instead of using auxiliary materials with different surface materials such as quick-drying adhesive and double-sided tape, so that more accurate data on the adhesion force of the separator surface coatings may be obtained. Iin addition, the samples to be tested are pressed and compounded together by hot pressing, which is simple and quick to operate, and the 90° peel test is more convenient than a 180° peel test which requires the aid of other auxiliary materials.

The following table 3 shows the results of dry peeling force testing on three different types of oil-based separators.

that of FIG. 9. For the cell obtained by the winding, part of each cell is subjected to quality inspection, including the folding of the separator and the peeling and transfer of the coating. The inspection results are shown in the following table 4. In the following table 4, the distance of electrode sheet covered by the separator refers to the over-covering size of the separator to the negative electrode sheet, which is used to prevent the short circuit inside the cell. In this disclosure, an adhesive transfer area ratio is further used to reflect the adhesive transfer performance during the dry peeling of the separator, as another performance parameter to select a suitable separator. Adhesive transfer area ratio=transfer mass/separator area, in which transfer mass=mass of separator (to be tested) before dry peeling−13 mass of separator (to be tested) after dry peeling. Taking a separator with a width of 15 mm and a length of 150 mm as an example, the mass of the separator before dry peeling is

TABLE 3

| EJ oil-based separator (26 m/min) | Adhesive surface (N/m) | Ceramic surface (N/m) | EJ oil-based separator (16 m/min) | Adhesive surface (N/m) | Ceramic surface (N/m) | Oil-based separator with large poles | Adhesive surface (N/m) | Ceramic surface (N/m) |
|---|---|---|---|---|---|---|---|---|
| EJ oil-based separator 1 | 18.4 | 12.1 | EJ oil-based separator 5 | 16.6 | 8.0 | Oil-based separator with large poles 1 | 3.9 | 3.8 |
| EJ oil-based separator 2 | 19.9 | 12.7 | EJ oil-based separator 6 | 18.3 | 10.7 | Oil-based separator with large poles 2 | 2.2 | 1.8 |
| EJ oil-based separator 3 | 18.1 | 11.8 | EJ oil-based separator 7 | 16.3 | 5.4 | Oil-based separator with large poles 3 | 3.9 | 2.8 |
| EJ oil-based separator 4 | 19.1 | 12.4 | EJ oil-based separator 8 | 15.4 | 9.4 | Oil-based separator with large poles 4 | 4.2 | 3.6 |
| Average | 18.88 | 12.25 | Average | 16.63 | 8.38 | Average | 3.55 | 2.95 |

Figure 15:
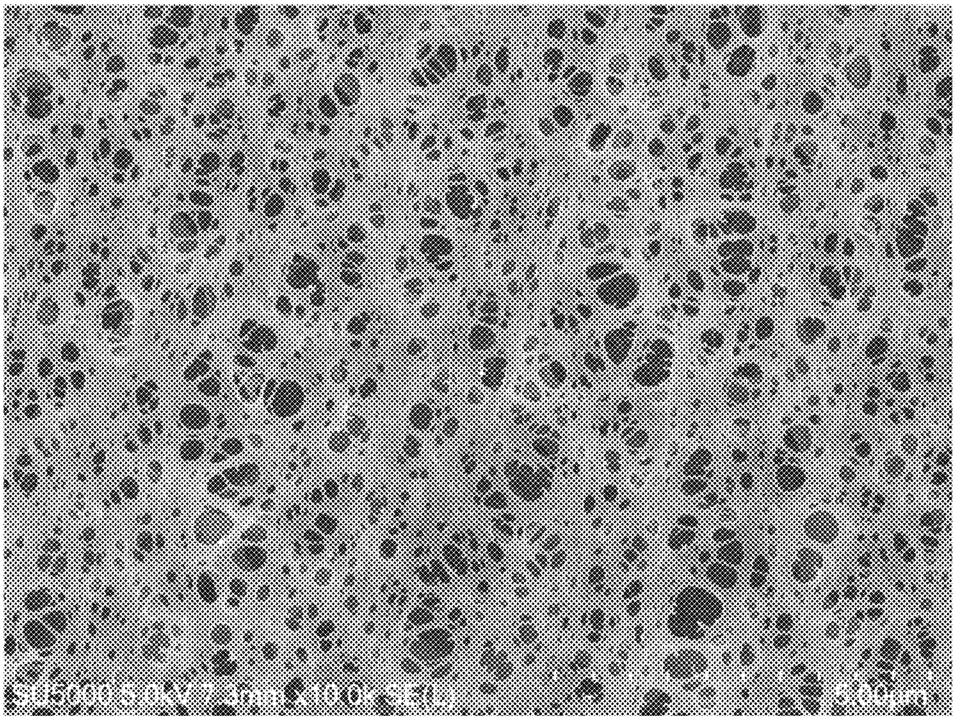
FIG. 15 is an SEM image of a ceramic surface of an EJ oil-based separator 5 before hot pressing.
Figure 16:
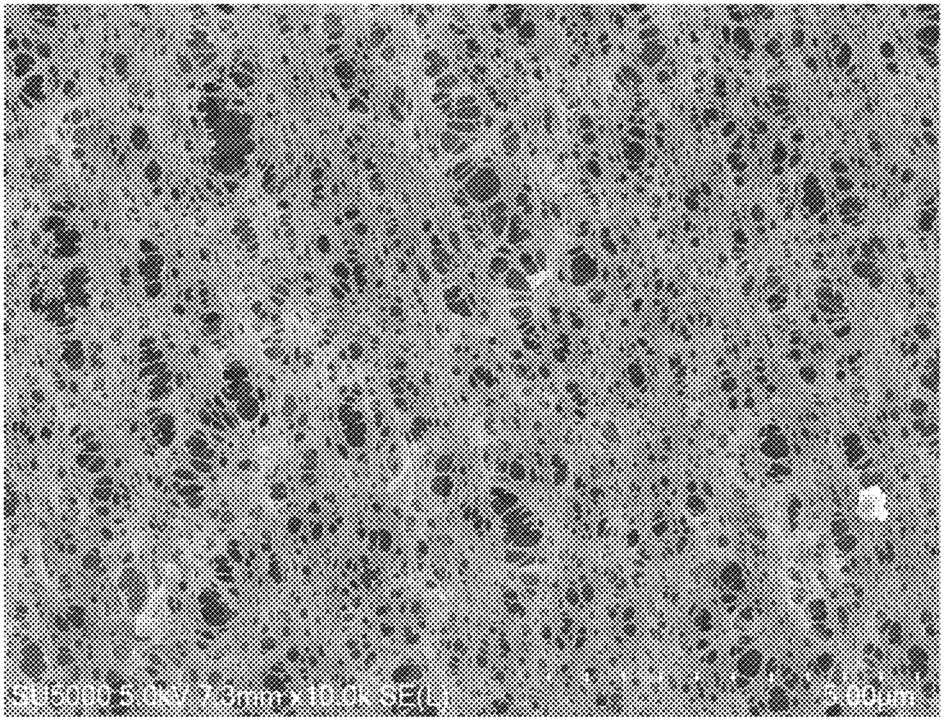
FIG. 16 is an SEM image of a substrate surface of an EJ oil-based separator 1 before hot pressing.
Figure 17:
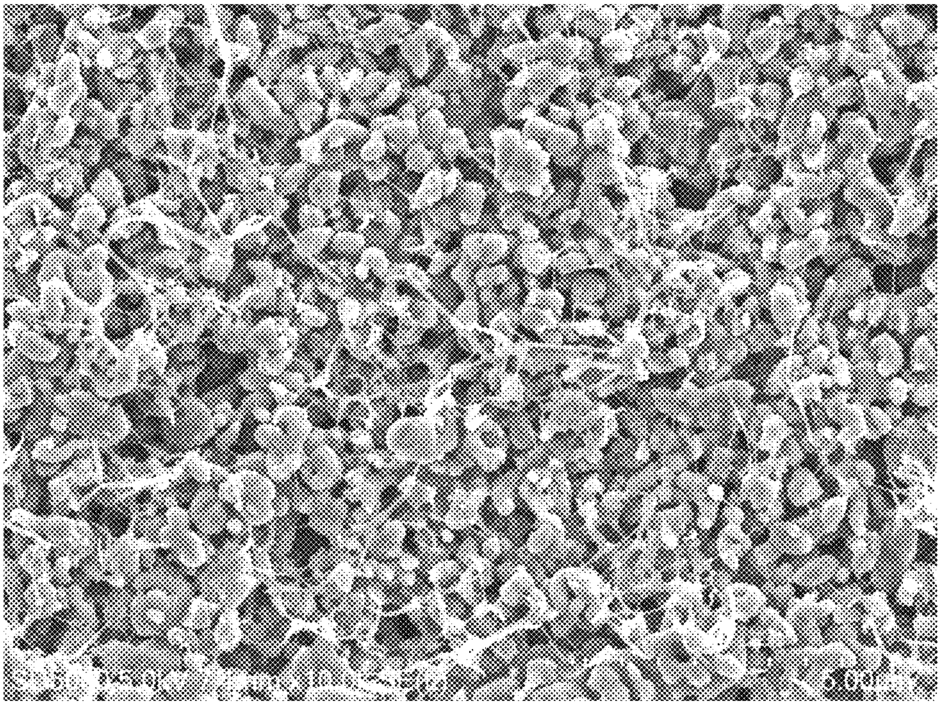
FIG. 17 is an SEM image of the ceramic surface of an EJ oil-based separator 5 after peeling.
Figure 18:
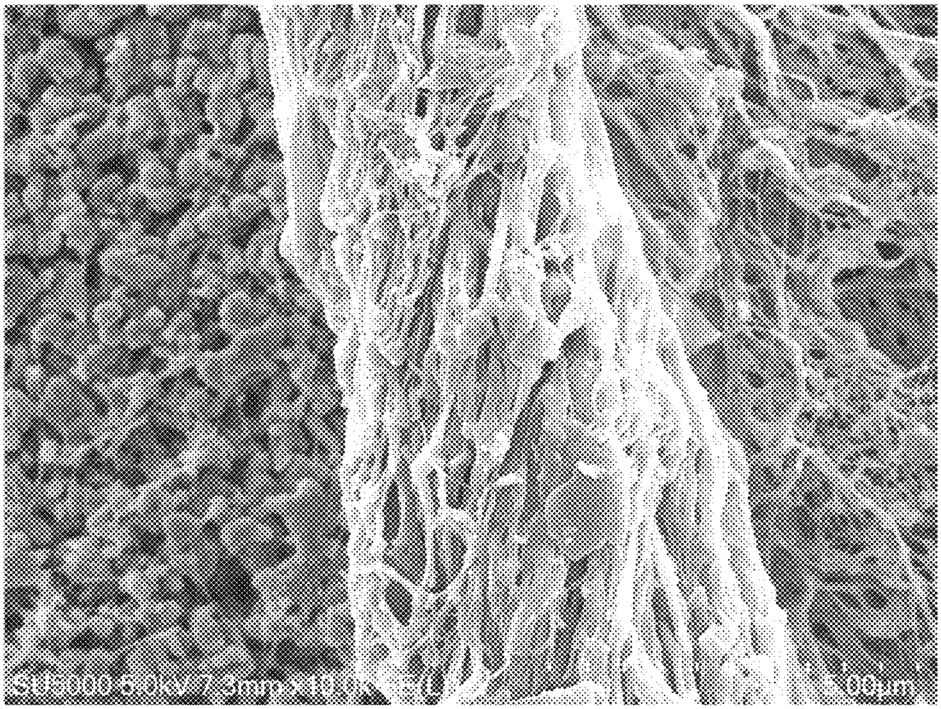
FIG. 18 is an SEM image of the ceramic surface of an EJ oil-based separator 6 after peeling.
Figure 19:
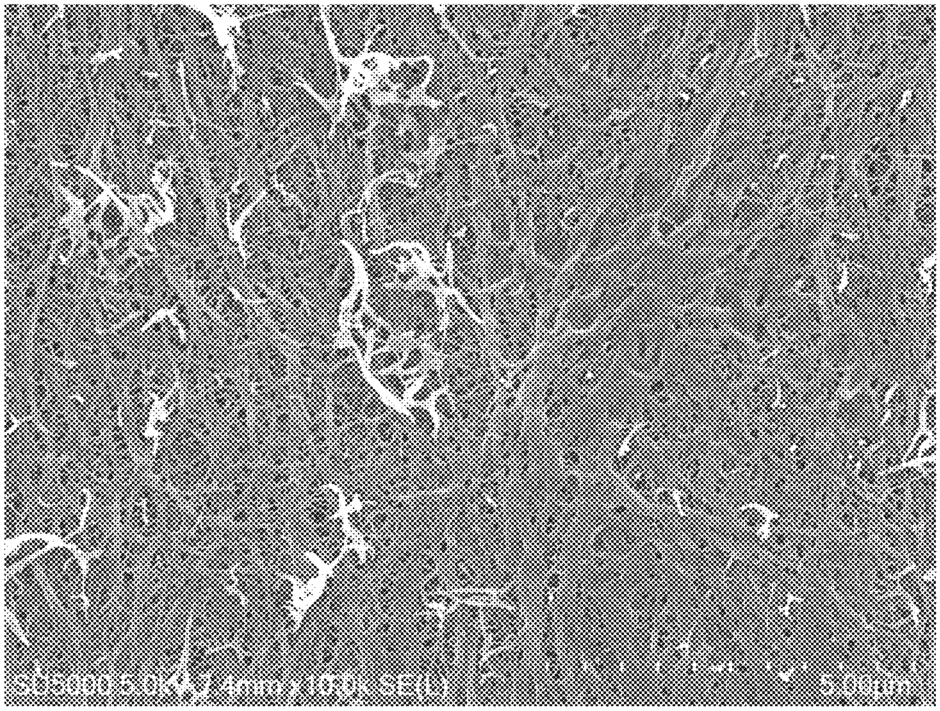
FIG. 19 is an SEM image of the substrate surface of the EJ oil-based separator 1 after peeling.
Figure 20:
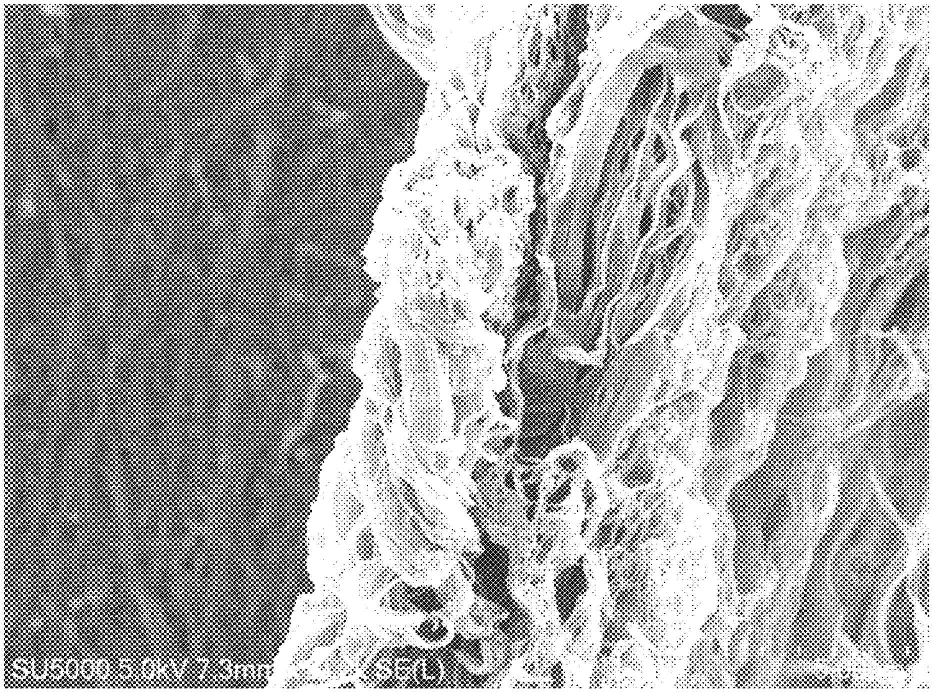
FIG. 20 is an SEM image of the substrate surface of the EJ oil-based separator 2 after peeling.

Five kinds of separators are selected from the above separators for which the dry peeling force has been tested, and wound together with the positive and negative electrode sheets to form a cell, in which the separators used have a width of 83.8 mm, the positive electrode sheet has a width of 79.5 mm, the negative electrode sheet has a width of 81.5 mm, and both the positive electrode sheets and the negative electrode sheets are conventional types for lithium batteries. FIG. 15 and FIG. 16 are SEM images of the substrate surfaces of the EJ oil-based separator 5 and the EJ oil-based separator 1 before hot pressing, respectively. The SEM images of the substrate surfaces of the EJ oil-based separators 6-8 before hot pressing are similar to that of FIG. 16, and the SEM images of the substrate surfaces of the EJ oil-based separators 2-4 before hot pressing are similar to 0.18 g, and the mass of the separator after dry peeling is 0.12 g, then the adhesive transfer area ratio=(0.18−0.12)/(0.015*0.15)=0.06/0.00225=26.67 g/$m^2$; adhesive transfer ratio of separator=0.06/0.18×100%=33% (the adhesive transfer ratio of separator=mass of separator (to be tested) before dry peeling−mass of separator (to be tested) after dry peeling/mass of separator (to be tested) before dry peeling× 100%). If the transfer area is larger, the adhesiveness is greater, the adhesion between the electrode sheets of the cell and the separator is greater, and accordingly, the winding is more difficult, and the ratio of removed core and poor spacing is larger, and the possibility of folding is more, and the battery has higher hardness.

TABLE 4

| Separator type | Adhesive surface (N/m) | Ceramic surface (N/m) | Length/width of folding | Distance of electrode sheet covered by the separator | Adhesive transfer ratio of the separator |
|---|---|---|---|---|---|
| EJ oil-based separator 5 | 16.6 | 8.0 | Length 4.35 mm Width 0.2 mm | 2.3 mm | 32% |
| EJ oil-based separator 8 | 15.4 | 9.4 | Length 3.52 mm Width 0.15 mm | 2.3 mm | 38% |

TABLE 4-continued

| Separator type | Adhesive surface (N/m) | Ceramic surface (N/m) | Length/width of folding | Distance of electrode sheet covered by the separator | Adhesive transfer ratio of the separator |
|---|---|---|---|---|---|
| oil-based separator with large holes 1 | 3.9 | 3.8 | None | 2.3 mm | 0% |
| EJ oil-based separator 1 | 18.4 | 12.1 | Length 6.87 mm Width 0.45 mm | 2.3 mm | 68% |
| EJ oil-based separator 3 | 18.1 | 11.8 | Length 7.83 mm Width 0.35 mm | 2.3 mm | 55% |

According to the sampling inspection results, for micro concave roll oil-based separator, when the dry peeling force of the separator ceramic surface is greater than 10 N/m, the folding of electrode sheet and empty foil is prone to appear in the wound core when winding during the winding process, and the folding phenomena of empty foil and electrode sheet is prone to appear during the hot-pressing or drying of the wound core, accounting for 80% or more. SEM images of the ceramic surface (the ceramic layer and the adhesive layer) and the substrate surface (the adhesive layer) of the separator are shown in FIG. 17 to FIG. 20 respectively, in which the phenomenon of peeling and transfer appears at the adhesive layer of each of the ceramic surface and the substrate surface of the separator, and the adhesive transfer ratio reaches up to 40% -80%; and with the increase of the dry peeling force, the adhesive transfer ratio of separator and the transfer area increase. For a single piece of separator, the dry peeling force of the adhesive surface (substrate surface) is greater than that of the ceramic surface, so the dry peeling force of the ceramic surface may be used for selecting separator material.

When the dry peeling force of the ceramic surface is in the range of 5 N/m-8 N/m, the proportion of electrode sheet and empty foil being folded occurred in the wound core decreases significantly when the cell is removed from the working table during the winding process, and the proportion of empty foil and folded electrode sheet occurred during the hot-pressing or drying of the wound core is obviously reduced to 30%. After a dry pressing, the ceramic surface and the substrate surface of the separator both show an effect of SEM images similar to FIG. 17 to FIG. 20; the phenomenon of peeling and transfer appears at the adhesive layer of the ceramic surface or the substrate surface of the separator, in which the transfer area ratio is reduced to 20% to 40%.

When the dry peeling force of the ceramic surface is less than 5 N/m, the folding of the electrode sheet and the empty foil rarely occurs in the wound cell when the wound cell is removed from the working table during the winding process, and the phenomena of empty foil and folded electrode sheet rarely occur during the hot-pressing or drying of the wound core, and the ceramic surface and the substrate surface of the separator after peeling do not appear the effect of SEM images shown in FIG. 17 to FIG. 20.

To sum up, it can be seen that for the separator with a larger dry peeling force (surface adhesion force), when the dry peeling force is greater than 8 N/m, it cannot be used well in the winding process; when the dry peeling force is less than 8 N/m, the phenomenon of electrode sheet being folded has been improved; when the thy peeling force is less than 5 N/m, the separator is well used in the winding process, the manufacturing process of the wound core is stable, and the proportion of the electrode sheet being folded is relatively low, even low to 0. However, the separator with a larger adhesion force shows better bonding performance during hot pressing and formation in subsequent process, and realizes the bonding between the separators and the positive and negative electrode sheets. Accordingly, the battery has a better hardness, and the separators at the head and bottom of the wound core in the cell have a better contact adhesion during hot pressing and formation, and the internal short circuit caused by the contact of the positive and negative electrodes may be avoided when the cell is subjected to a furnace temperature test for the safety performance. However, if the electrode sheet or the separator is folded, the safety performance of the cell will be reduced.

Therefore, in order to avoid the problem that the electrode sheets are folded after winding, top & side sealing and baking, the separator may be selected according to the dry peeling force of the surface of the separator, for example, the dry peeling forces of the first straight section of the inner separator and the first straight section of the outer separator are each less than 8N/m in the wound core of the lithium battery, so as to improve the phenomenon of the electrode sheets being folded. By using the first straight section of the separator with a small dry peeling force, the phenomenon of the electrode sheets being folded is improved, without affect the bonding of other parts of the separator, so as to ensure the hardness of the battery. More preferably, the dry peeling force is the dry peeling force between the ceramic surfaces of the separators.

The above description of the disclosed embodiments enables those skilled in the art to achieve or use this disclosure. Various modifications to these embodiments will be obvious for those skilled in the art, and the generic principles defined herein may be implemented in other embodiments without departing from the spirit or scope of the disclosure. Therefore, this disclosure is not intended to be limited to the embodiments shown herein, but is to conform to the widest scope consistent with the principles and novel features disclosed herein.

What is claimed is:

1. A lithium-ion battery, comprising a wound core and tabs, wherein the wound core is formed by stacking and winding an inner separator, a first electrode sheet, an outer separator and a second electrode sheet, and the first electrode sheet and the second electrode sheet have opposite polarity;

the inner separator is located at the innermost layer of the wound core, and each of the inner separator and the outer separator has a clamping section, a first straight section connected with the clamping section and located behind the clamping section, a tail laminating section extending beyond a tail end of the first electrode sheet, wherein the first straight section is located in front of the first electrode sheet, and the first electrode sheet is inserted between the inner separator and the outer separator at an initial stage of winding; and the tail laminating section is a separator end, the inner separator has a first inner laminating section, the clamping section, the first straight section and the tail laminating section of the inner separator are respectively laminated with the clamping section, the first straight section and the tail laminating section of the outer separator, and the first inner laminating section of the inner separator is represented as two parts of the inner separator that are laminated;

an adhesive surface of the first inner laminating section of the inner separator has a wet peeling force of ≥2 N/m and a ceramic surface of the first inner laminating section of the inner separator has a wet peeling force of ≥1 N/m.

2. The lithium-ion battery according to claim 1, wherein the wet peeling force is determined by the following steps:

S1: cutting a separator to bhe tested into separator samples with suitable size, and aligning and stacking two pieces of separator samples to be tested;

S2: placing the two pieces of separator samples to be tested that are stacked into an aluminum-plastic film for packaging, injecting an electrolyte, vacuuming and sealing;

S3: subjecting sealed aluminum-plastic film to a hot-pressing treatment using a formation machine under a temperature of 80° C. and a pressure of 0.8 MPa for 2 h;

S4: removing the separator samples to be tested from the aluminum-plastic film after the hot-pressing treatment is completed, wiping the electrolyte off the separator samples, placing the wiped separator samples into a hard sealer, and performing a further hot-pressing treatment under a temperature of 100° C. and a pressure of 0.2 MPa for 10 s; and S5: separating the two pieces of separator samples to bhe tested that are pressed together from one end of the separator samples after the further hot-pressing treatment is completed, performing a 90° peeling, and recording a peeling force during separation of the separator samples to be tested, the peeling force being a wet peeling force.

3. The lithium-ion battery according to claim 1, wherein a length of the first inner laminating section of the inner separator is 30-60% of a width of the wound core.

4. The lithium-ion battery according to claim 1, wherein each of the inner separator and the outer separator comprises a base film, a ceramic layer and an adhesive layer; and one surface of the base film is provided with the ceramic layer, and the other surface of the base film is provided with the adhesive layer; an outer surface of the ceramic layer is provided with the adhesive layer; and a surface of the separator having both the ceramic layer and the adhesive layer is a ceramic surface, and a surface of the separator only having the adhesive layer is an adhesive surface.

5. The lithium-ion battery according to claim 4, wherein surfaces of the inner separator and of the outer separator that are opposite to each other on the clamping section, the first straight section and the tail laminating section are the ceramic surfaces; a surface of the inner separator that faces to itself on the first laminating section is the adhesive surface.

6. The lithium-ion battery according to claim 4, wherein surfaces of the inner separator and of the outer separator that are opposite to each other on the clamping section, the first straight section and the tail laminating section are the adhesive surfaces; a surface of the inner separator that faces to itself on the first laminating section thereof is the ceramic surface.

7. The lithium-ion battery according to claim 1, wherein a length of the clamping section of the inner separator and a length of the clamping section of the outer separator are each 1-15% of a width of the wound core; and/or a length of the first straight section of the inner separator and a length of the first straight section of the outer separator are each 40-50% of the width of the wound core.

8. The lithium-ion battery according to claim 1, wherein a length of the tail laminating section of the inner separator and a length of the tail laminating section of the outer separator are each ≥5 mm; and/or a length of the tail laminating section of the inner separator and a length of the tail laminating section of the outer separator are each 0.1-10% of a width of the wound core.

9. The lithium-ion battery according to claim 1, wherein the lithium-ion battery has an overall hardness ≥200 N.

10. The lithium-ion battery according to claim 1, wherein a dry peeling force of the first straight section of the inner separator and a dry peeling force of the first straight section of the outer separator are each less than 8 N/m; and the dry peeling force is determined by the following steps:

S1: cutting a separator to be tested into separator samples with suitable size and aligning and stacking two pieces of separator samples to be tested;

S2: subjecting stacked separator samples to be tested to hot-pressing under temperature of 100° C. and a pressure of 0.2 MPa for 10 s; and S3: after the hot-pressing treatment is completed, separating the separator samples to be tested that are pressed together from one end of the separator samples to be tested, performing a 90° peeling, and recording a peeling force during separation of the separator samples to be tested, the peeling force being the dry peeling force.

11. The lithium-ion battery according to claim 4, wherein each of the inner separator and the outer separator is selected from one of a water-based separator, an oil-based mixed-coating separator and a pure oil-based separator.

12. The lithium-ion battery according to claim 11, wherein the separator is the water-based separator, and the adhesive layer comprises an adhesive polymer, a binder and a dispersing agent; wherein a content of the adhesive polymer accounts for 92-96%, a content of the binder accounts for 2.5-5.5%, and a content of the dispersing agent accounts for 1.5-2.5%, based on a total mass of the adhesive layer.

13. The lithium-ion battery according to claim 11, wherein the separator is the oil-based mixed-coating separator, and the adhesive layer comprises an adhesive polymer and ceramic particles; wherein the adhesive polymer has a content of 30-50% and the ceramic particles have a content of 50-70% based on a total amount of the adhesive layer.

14. The lithium-ion battery according to claim 11, wherein the separator is the pure oil-based separator, and the adhesive layer comprises an adhesive polymer, and the adhesive polymer has a molecular weight of 0.3 to 1 million.

15. The lithium-ion battery according to claim 4, wherein the adhesive layer has a thickness of 0.5 μm to 3 μm, and a packing density of 0.6 $g/m^2$ to 3.0 $g/m^2$.

16. The lithium-ion battery according to claim 4, wherein the adhesive layer comprises an adhesive polymer, and the adhesive polymer is selected from at least one of polyvinylidene fluoride, polyvinylpyrrolidone, vinylidene fluoride-hexafluoropropylene polymer, polyacrylonitrile, sodium carboxymethyl cellulose, sodium polyacrylate, polyacrylic acid, polyacrylate, styrene-butadiene copolymer, butadiene-acrylonitrile polymer, polyvinyl alcohol, polymethyl acrylate, polymethyl methacrylate, polyethyl acrylate and polyacrylic acid-styrene polymer.

17. The lithium-ion battery according to claim 4, wherein the ceramic layer comprises ceramic particles and an adhesive polymer; and a content of the ceramic particles accounts for 85-92% of a total amount of the ceramic layer.

18. The lithium-ion battery according to claim 17, wherein the ceramic particles are selected from at least one of alumina particles, boehmite particles, and magnesia particles.

19. The lithium-ion battery according to claim 17, wherein a particle size distribution of the ceramic particles is: D10 particle size being 0.15-0.3 μm, D50 particle size being 0.35-0.45 μm, D90 particle size being 0.6-0.8 μm, and D100 particle size being less than 4.5 μm.

20. The lithium-ion battery according to claim 10, wherein when a dry peeling is performed, each of the inner separator and the outer separator has an adhesive transfer area ratio of 20-40%.

* * * * *